United States Patent [19]

Smith et al.

[11] 4,186,303
[45] Jan. 29, 1980

[54] EXCLUSION OF ALPHA PARTICLES FROM THORON IN URANIUM DETECTION

[75] Inventors: Richard C. Smith, O'Hara Township, Allegheny County; Ira E. Kanter, Monroeville, both of Pa.

[73] Assignee: Westinghouse Electric Corp., Pittsburgh, Pa.

[21] Appl. No.: 868,779

[22] Filed: Jan. 12, 1978

[51] Int. Cl.$^2$ .......................... G01V 5/00; B01D 59/10
[52] U.S. Cl. ........................................ 250/253; 55/16; 250/472
[58] Field of Search ............... 250/253, 267, 472, 473; 55/16, 17

[56] References Cited
U.S. PATENT DOCUMENTS 3,968,371  7/1976  Greendale ............................ 250/255
4,053,772  10/1977  Felice .................................. 250/253
4,064,436  12/1977  Ward .................................... 250/253

Primary Examiner—Alfred E. Smith
Assistant Examiner—Jaice A. Howell
Attorney, Agent, or Firm—R. D. Fuerle

[57] ABSTRACT

Alpha particles emitted from radon 220, a daughter product formed from the decay of thorium, are prevented from reaching an alpha particle detector by enclosing the detector in a volume into which alpha-emitting radioactive gases can only enter through a semipermeable membrane at least about 10 mg/cm$^2$ in thickness. The enclosed volume must be between 30 and 2000 cm$^3$ and the (AP)/(VL) ratio must be between $10^{-7}$ and $10^{-5}$. Also, the detector must be positioned so as to expose it to gas from the membrane for a distance of at least 2 cm through a solid angle of at least one steradian.

20 Claims, 3 Drawing Figures

EXCLUSION OF ALPHA PARTICLES FROM THORON IN URANIUM DETECTION

BACKGROUND OF THE INVENTION

Radon 222 is a radioactive gas formed by the decay of uranium. Although an underground deposit of uranium is relatively immobile, the radon gas it produces gradually rises to the surface. At or just beneath the surface, detectors can be positioned in a grid pattern to detect and count the alpha particles emitted when radon 222 decays. In this way, a map of the area can be produced which hopefully shows the location of the underground uranium deposit.

Another naturally-occurring radioactive element is thorium. Thorium decays to the radioactive gas radon 220 (commonly known as "thoron"), which also emits alpha particles when it decays. Therefore, the detection of large quanitities of alpha particles from radon gas may indicate that thorium is underground, not uranium. At current prices, thorium is not worth mining, but, until now, a simple, low-cost method of distinguishing between alpha particles from radon 220 and alpha particles from radon 222 was not available.

PRIOR ART

U.S. Pat. No. 3,862,576 discloses the detection of helium using an underground chamber covered by a membrane. The detection of radon is discussed (column 3, lines 17 to 27).

U.S. Pat. No. 3,968,371 discloses the detection of radon using an alpha-particle detector covered with a movable membrane to remove polonium.

U.S. Pat. No. 3,866,043 discloses an alpha-particle detector placed upstream of a membrane for the detection of polonium trapped on the filter.

A. Y. Smith, P. M. C. Burretto, and S. Pournis, in an article titled "Radon Methods in Uranium Exploration," Proceedings of the International Symposium on the Exploration of Uranium Ore Deposits, International Atomic Energy Agency, Vienna, March 29–Apr. 2, 1976, describe a field test where the presence of radon 220 interfered with the alpha-particle count from radon 222. They concluded: "This example illustrates the importance of distinguishing between the isotopes of radon. Such a procedure is not possible in those systems designed to measure radon in a flowing gas stream, nor with the alpha-track methods."

U.S. Pat. No. 4,053,772 discloses the use of thermoluminescent foils to detect alpha particles from underground radon.

U.S. Pat. No. 3,614,421 places alpha-particles detectors upstream and downstream of a porous filter to measure the effectiveness of the filter in trapping radon daughters.

U.S. Pat. No. 3,555,278 detects alpha particles from radon daughter products by placing a detector upstream of a membrane.

SUMMARY OF THE INVENTION

We have discovered that alpha particles from radon 220 can be substantially excluded from a detector without a significant exclusion of alpha particles from radon 222 by enclosing the detector in a volume accessible by alpha particles only if the radon first passes through a semipermeable membrane, provided certain parameters concerning the membrane, the volume enclosing the detector, and the placement of the detector are strictly adhered to.

The exclusion of alpha particles from radon 220 can be accomplished according to this invention with relatively little additional cost.

The membrane also serves to prevent water vapor from entering the volume of the enclosure and from then depositing a wet film on the surface of the detector. Such wet films have been found to render detectors somewhat or entirely insensitive to alpha particles simply because the alphas do not have enough energy to penetrate from the air through the water layer to the detector.

DESCRIPTION OF THE INVENTION

Figure 1:
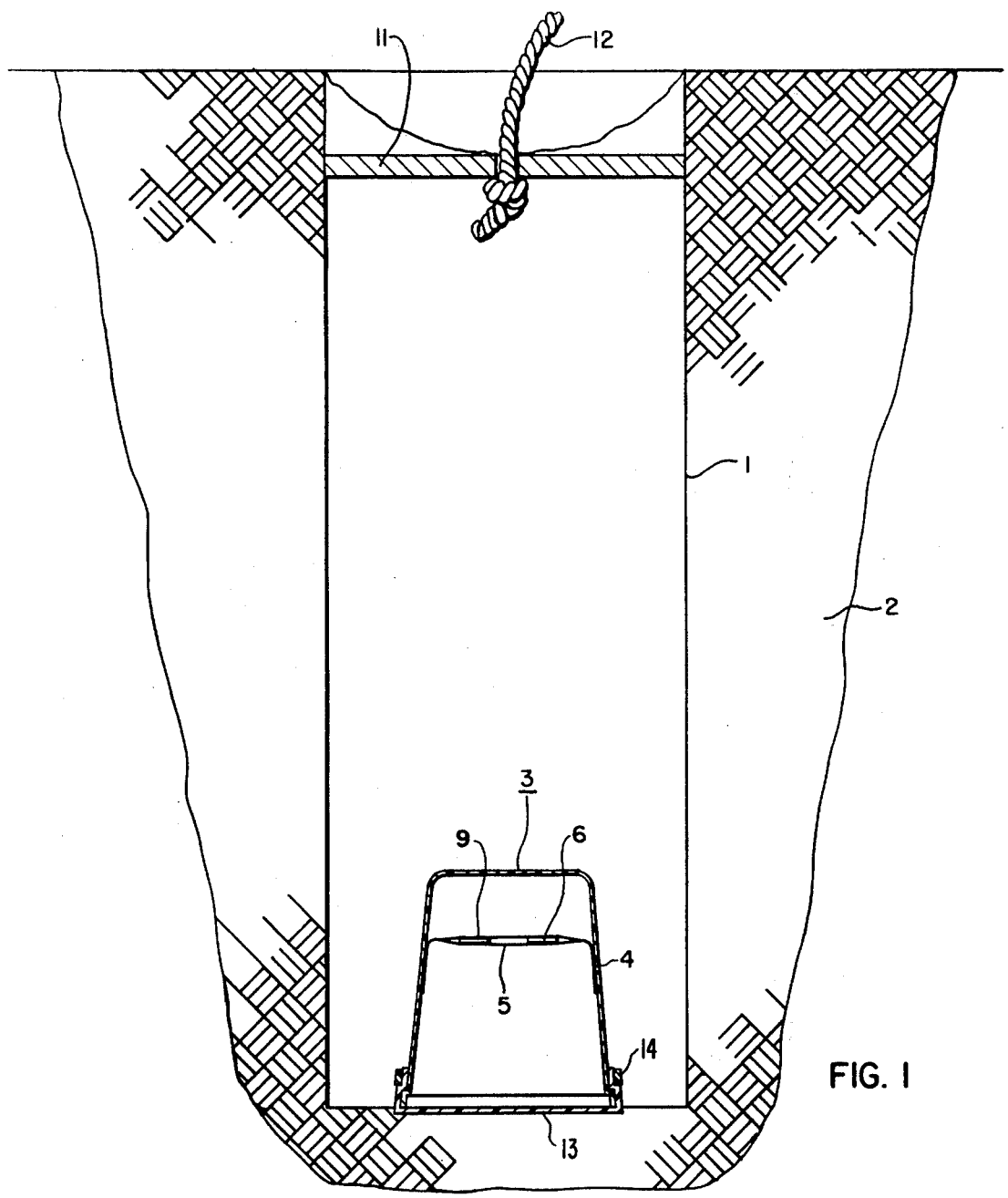
FIG. 1 is a side view of section of a certain presently preferred embodiment of the improved detector apparatus of this invention in an underground testing environment.
Figure 2:
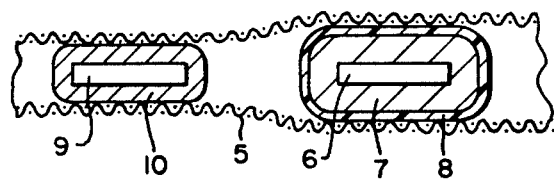
FIG. 2 is an enlarged sectional view of a portion of FIG. 1.

In FIGS. 1 and 2 a hole 1 preferably about 24 to about 30 inches below the surface of ground 2 houses dosimeter housing 3 which consists of an inverted cup 4 to which metallic screen 5 has been stapled or otherwise affixed. To the screen are affixed two alpha-particle sensitive dosimeters, one 6 shielded with aluminum 7 or other material to exclude alpha particles but not beta and gamma ray background radiation, and sealed in 2 mil polyethylene 8, and the other 9 contained in 0.030 mil aluminum 10 which permits the passage of alpha, beta, and gamma particles but excludes dust particles. A cover 11, secured to rope 12, protects the dosimeters. Across the face of cup 4 is a semipermeable membrane 13 secured by rubber band 14.

Although any alpha-particle sensitive dosimeter can be used in the practice of this invention, the thermoluminescent dosimeters described in U.S. Pat. No. 4,053,772 are preferred as they are inexpensive, reusable, and easily read. Other suitable alpha particle detectors include track etch dosimeters, surface barrier dosimeters, solid state alpha detectors, scintillation detectors, ionization detectors, proportional counters, etc.

A number of such cups are generally placed underground in a grid pattern, preferably about 100 to about 200 feet apart, and are left for about two to about four weeks before being collected and read. The underground location, preferably at least one foot below the surface, helps to decrease detection of background surface radiation.

The apparatus shown in the drawing operates in the following manner to detect alpha particles from radon 222 while substantially excluding alpha particles from radon 220. Radon 222 and thoron gases from underground uranium or thorium deposits rise from the ground and diffuse through the semipermeable membrane. The diffusion through this membrane requires a certain length of time, which varies with the permeability and thickness of the membrane. Since thoron and radon 222 are chemically identical and differ in weight by only 0.9%, they will diffuse through the membrane at the same rate. But because thoron has a half-life of 55.6 seconds and radon 222 has a half-life of 330,000 seconds, a proper selection of various parameters can cause most of the thoron to decay in the membrane while most of the radon 222 passes through the membrane before it decays. The alpha particles from the thoron, and also from further daughter products such as polonium, then do not reach the detector.

To further increase the accuracy of the measurement, the second alpha-particle detector shown in the drawing can also be used. This second alpha-particle detector is shielded from alpha particles but not from beta or gamma rays by a shield of, for example, aluminum foil about 3 mils thick, so that it measures only beta and gamma ray bombardment. Since both detectors are likely to receive about the same exposure to radiation, the count of the second detector can be subtracted from the count of the unshielded detector to give a more accurate measurement of alpha-particle radiation.

It is the discovery that a suitable membrane between the detector and the radon source permits one to distinguish between alpha particles from radon 220 and alpha particles from radon 222, and the discovery of the parameters defining the membrane characteristics, the volume enclosed by the membrane, and the position of the detector that constitutes this invention.

The membrane must be a semipermeable membrane rather than simply a porous filter. In a semipermeable membrane the gas can pass only by dissolving in the outside surface of the membrane, diffusing through the membrane thickness, and evaporating from the inside surface. A porous filter has visible or microscopic pores in it through which the gas molecules simply move without dissolution. A porous filter will collect particles but will not delay the passsage of radon gas so as to cause the radon 220 gas to decay before it is within range of the detector. The membrane must also be water-insoluble since the cups may be rained on or placed in a damp environment. The membrane should be fixed and immobile relative to the detector since a movable membrane is unnecessary, prohibitively expensive, and would carry radon atoms away before they passed through it.

Good membrane materials are very thick yet highly permeable as these characteristics differentiate most between radon 222 and thoron. The best material so far identified is silicon rubber, but natural rubber, neoprene, or other types of polymeric films could also be used. A minimum thickness of 10 mg/cm$^2$ is required to adequately distinguish between the thoron and radon 222 alpha particles. This limit prevents alpha particles from being registered by the detector by a second mechanism unrelated to permeation by the radon. If the membrane is too thin, then alpha particles could possibly shoot right through the membrane even if the radon atoms which emit them are still outside the enclosure volume. (Penetration by alpha particles of a given energy is a function of density, so stating thickness in terms of mg/cm$^2$ limits alpha-particle penetration. Conversion to minimum thickness in centimeters can be made by dividing the density of the particular material used into 10 mg/cm$^2$. For example, having a density of about 1.2 g/cm$^3$, silicon rubber about 83 microns thick is about 10 mg/cm$^2$. For reasons of strength, however, thicknesses of about 500 to 900 microns are preferable for silicon rubber.)

Figure 3:
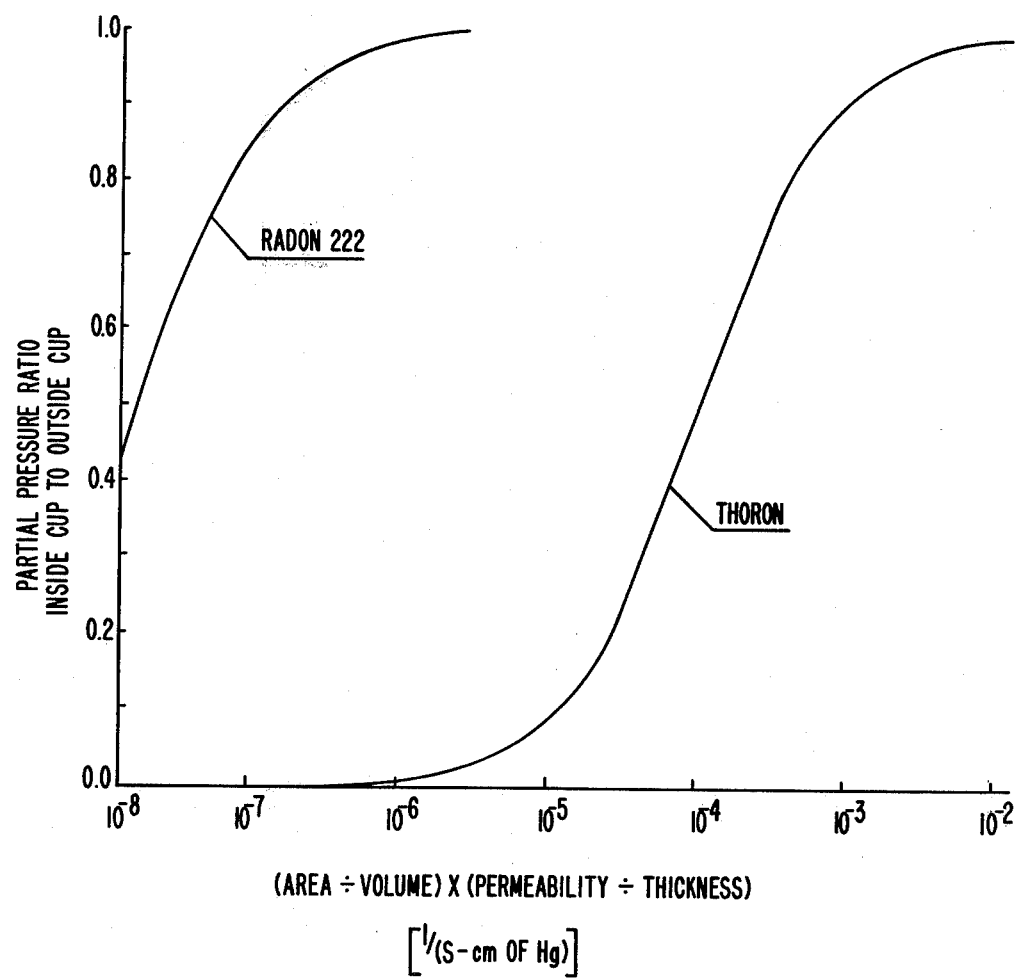
FIG. 3 is a graph showing how the partial pressure of radon 222 and thoron vary as the ratio (AP)/(VL) increases.

The relative quantities of radon and thoron alpha particles detected inside the volume enclosed by the membrane is a function of the relative partial pressures of radon and thoron in that volume. These partial pressures are determined by the ratio $(AP)/(VL)$ where A is the area of the membrane [cm$^2$] through which the gases pass, P is the permeability of the membrane in units of $[(cm^3$ at STP/s)/cm$^2) \times (cm/cm$ of Hg)], V is the volume [cm$^3$] enclosed by the membrane and any other parts of the structure such as cup 4 of FIG. 1 (excluding the volume of the detector and any support structure), and L is the radon-permeable thickness of the membrane [cm]. Referring to FIG. 3, one can see that between an $(AP)/(VL)$ ratio of about $10^{-7}$ and $10^{-5}$ measured in units of $1/(s$-cm of Hg), very little radon 222 is excluded and very little thoron is admitted. At an $(AP)/(VL)$ ratio of less than about $10^{-7}$ more radon 222 is excluded but almost no more thoron is excluded, and at an $(AP)/(VL)$ ratio of more than about $10^{-5}$, more thoron is admitted but almost no more radon 222 is admitted. At a ratio of about $10^{-6}$ a maximum discrimination between radon 222 and thoron seems to occur.

The volume enclosed by said membrane must be at least about 30 cm$^3$ because at smaller volumes too few radon atoms are present, and therefore too few alpha particles are collected, to give significant readings. If the volume is greater than about 2000 cm$^3$, on the other hand, an impracticably large membrane is needed to admit sufficient radon to reach equilibrium, and the performance of the apparatus is not appreciably enhanced. The best compromise of these opposing considerations is believed to be achieved at a volume between about 100 and about 500 cm$^3$.

Finally, the detector must be positioned within the enclosed volume so that alpha particles emitted in the volume can, traveling in a straight line, reach the detector. This can be achieved if the detector is positioned so that it is exposed to gas in contact with the membrane for a linear distance of at least 2 cm, through a solid angle, with its apex at the detector, of at least one steradian. Preferably, the distance should be at least 4 cm and the angle at least $2\pi$ steradians, and most advantageously the detector is suspended in the center of the volume so that alpha particles emitted anywhere within their range are detected.

The enclosed volume is not to be limited to a plastic cup. The volume could also be fabricated from membrane-covered screen or polymer covered or calenderized screen. Such fabrication may result in a more sensitive or lower cost device.

The following example further illustrates this invention:

EXAMPLE

A large enclosed reservoir (volume = 8330 cm$^3$) containing a mixture of radon 222 gas and air at atmospheric pressure was prepared to provide an environment for testing the invention. The initial concentration of radon 222 in the reservoir corresponded to $1.0 \times 10^{-5}$ $\mu$Ci/cm$^3$ for each of the experiments performed. A cup (V=680 cm$^3$) having an electronic alpha-particle detector mounted inside was attached to the reservoir so that a hole in the reservoir wall matched the mouth of the cup in diameter when the hole was opened. The volume was thus slightly larger than the preferred range of 100 to 500 cm$^3$ but well within the acceptable range of 30 cm$^3$ to 2000 cm$^3$. It was possible to place a membrane over the mouth of the cup, the opening having an area of 20.3 cm$^2$. Since the detector had only one sensitive face, the maximum solid angle it viewed was $2\pi$ steradians. The cup had an inside radius of 3.49 cm. Since the detector was on the central axis of the cup, aimed at the cup mouth, and located 6.0 cm. from the membrane position, the $2\pi$ steradians preferred value was satisfied and the minimum distance to the walls of about 2 cm. was satisfied by the actual 3.49 cm. minimum value. The preferable distance of 4 cm. to the wall was also satisfied together with a $1.02\pi$ steradian solid angle, the minimum permitted value being about 1 steradian.

A series of three tests served to show that the invention performed properly. The first test, serving as a basis for comparison, employed no membrane. As soon as the cup was exposed to the reservoir, a radon alpha count rate was noted of about 180 counts per minute (including also alphas from the daughter product polonium-218 but not polonium-214, which was eliminated by means of alpha energy discrimination so as to make the test results easier to analyze on a time dependent basis). The activity died away as expected with the well-known radon 222 half life of 330,400 seconds. The second and third tests used membranes of DuPont Silicone rubber, type SS5550, of thicknesses $5.08 \times 10^{-2}$ cm. and $8.89 \times 10^{-2}$ cm., respectively. Initially, in these tests there was radon 222 only in the reservoir and not in the cup. The build-up with time of the alpha count rate inside the cup showed that the radon 222 was diffusing through the membrane as required for the invention. The transient permeation behavior noticed during these tests exhibited the familiar time-lag response. This occurs since initially the semipermeable membrane is free of the penetrating gas. The build-up time constant was measured to be between 4.9 hours and 5.4 hours for the thinner membrane and between 7.2 hours and 8.7 hours for the thicker one. Thoron, having the short half life of 55.6 seconds could not have survived long enough to build up a measurable activity in such long times. After about 30 to 40 hours, however, the radon 222 alpha count rate of about 140 to 150 counts/minute was close to the value measured with no membrane, after consideration of the loss rate due to the radioactive half life of radon 222. This behavior is in agreement with the steady state behavior presented in FIG. 3, since approximately equal count rates imply approximately equal partial pressures. The average measured value of the permeability P from these tests for the silicone rubber samples was $1.3 \times 10^{-6}$ ((cm$^3$ at STP/s)/cm$^2$)$\times$(cm/cm of Hg). The values of the ratio (AP)/(VL) were within the specified values of $10^{-7}$ to $10^{-5}$. Specifically (AP)/(VL) was measured to be between $6.7 \times 10^{-7}$ and $7.5 \times 10^{-7}$ for the thinner membrane and between $4.2 \times 10^{-7}$ and $5.1 \times 10^{-7}$ for the thicker membrane.

What we claim is:

1. In a method of locating an underground deposit of uranium by detecting alpha particles from the uranium daughter product radon 222, which has emanated from beneath the ground, a method of avoiding the detection of alpha particles from the thorium daughter product radon 220 comprising:

(a) forming a completely enclosed volume V containing said detector into which radon can only enter via a fixed, water-insoluble, semipermeable membrane of silicone rubber about 0.05 to about 0.09 cm in thickness, said volume V enclosed by said membrane, excluding the volume of said detector, being between about 30 and about 2000 cm$^3$ and the (AP)/(VL) ratio being between $10^{-7}$ and $10^{-5}$, where A is the radon-gas permeable area of said membrane, P is the permeability of said membrane, V is the volume enclosed by said membrane excluding the volume of said detector, and L is the thickness of said membrane; and (b) positioning said detector within the volume V so that said detector is exposed to gas in contact with said membrane for a distance of at least 2 cm through a solid angle emanating from said detector of at least one steradian.

2. A method according to claim 1 wherein said detector is positioned within the volume V so that said detector is exposed to gas in contact with said membrane for a distance of at least 4 cm through a solid angle emanating from said detector of at least $2\pi$ steradians.

3. A method according to claim 1 wherein said solid angle is $4\pi$ steradians.

4. A method according to claim 1 wherein said (AP)/(VL) ratio is about $10^{-6}$.

5. A method according to claim 1 wherein the volume enclosed by said membrane is about 100 to about 500 cm$^3$.

6. A method according to claim 1 wherein said detector does not contact said membrane.

7. A method according to claim 1 wherein said membrane is placed across the mouth of a plastic cup.

8. A method according to claim 7 wherein said membrane is supported only by said cup.

9. A method according to claim 1 wherein said detector is a thermoluminescent foil.

10. A method according to claim 1 wherein two detectors are positioned together, one unshielded from alpha particles and the other enclosed in a shield which excludes alpha particles but not gamma and beta rays, and said method includes the additional last step of subtracting the measurement of said shielded detector from the measurement of said unshielded detector.

11. In an apparatus for locating an underground deposit of uranium by detecting alpha particles from the uranium daughter product radon 222, said apparatus comprising an alpha-particle detector which is exposed to gases emanating from beneath the ground, an improvement which avoids the detection of alpha particles by said detectors from the thorium daughter product radon 220, said improvement comprising: a fixed, water-insoluble, semipermeable membrane of silicone rubber about 0.05 to about 0.09 cm in thickness, mounted so as to completely enclose said detector in a volume of space V into which alpha particle emitting gas can only enter via said membrane, said volume V, excluding the volume of said detector, being between about 30 and about 2000 cm$^3$ and the (AP)/(VL) ratio of said membrane being between about $10^{-7}$ and $10^{-5}$, where A is the radon-gas permeable area of said membrane, P is the permeability of said membrane, V is the volume enclosed by said membrane excluding the volume of said detector, and L is the thickness of said membrane, said detector being positioned within the volume V so that said detector is exposed to gas in contact with said membrane for a distance of at least 2 cm through a solid angle emanating from said detector of at least one steradian.

12. An apparatus according to claim 11 wherein said detector is positioned within the volume V so that said detector is exposed to gas in contact with said membrane for a distance of at least 4 cm through a solid angle emanating from said detector of at least $2\pi$ steradians.

13. An apparatus according to claim 11 wherein said solid angle is $4\pi$ steradians.

14. An apparatus according to claim 11 wherein said (AP)/(VL) ratio is about $10^{-6}$.

15. An apparatus according to claim 11 wherein the volume enclosed by said membrane is about 100 to about 500 cm$^3$.

16. An apparatus according to claim 11 wherein said detector does not contact said membrane.

17. An apparatus according to claim 11 wherein said membrane is placed across the mouth of a plastic cup.

18. An apparatus according to claim 17 wherein said membrane is supported only by said cup.

19. An apparatus according to claim 11 wherein said detector is a thermoluminescent foil.

20. Apparatus according to claim 11 wherein two detectors are positioned together, one being unshielded from alpha particles and the other being enclosed in a shield which excludes alpha particles but not gamma and beta rays.

* * * * *